(12) United States Patent
Takahashi et al.

(10) Patent No.: US 8,387,932 B2
(45) Date of Patent: Mar. 5, 2013

(54) SUCTION CUP AND SUCTION CUP DEVICE

(75) Inventors: Shunichi Takahashi, Tokyo (JP); Makoto Kawabata, Tokyo (JP)

(73) Assignee: Sony Corporation, Tokyo (JP)

( * ) Notice: Subject to any disclaimer, the term of this patent is extended or adjusted under 35 U.S.C. 154(b) by 203 days.

(21) Appl. No.: 12/047,919

(22) Filed: Mar. 13, 2008

(65) Prior Publication Data

US 2008/0230662 A1 Sep. 25, 2008

(30) Foreign Application Priority Data

Mar. 20, 2007 (JP) ................................. 2007-072505

(51) Int. Cl.
*A45D 42/14* (2006.01)
*F16B 47/00* (2006.01)
(52) U.S. Cl. ................. 248/205.5; 248/206.1; 248/206.2
(58) Field of Classification Search ............... 248/125.2, 248/205.5–9, 206.1–4, 217.4
See application file for complete search history.

(56) References Cited

U.S. PATENT DOCUMENTS

| 2,089,714 A * | 8/1937 | Schuler ........................ 248/363 |
| 2,233,870 A * | 3/1941 | Muter ......................... 248/205.8 |
| 2004/0111098 A1* | 6/2004 | Hallen .......................... 606/123 |
| 2007/0290105 A1* | 12/2007 | Liu ............................ 248/205.5 |

FOREIGN PATENT DOCUMENTS

| JP | 46-3861 | | 2/1971 |
| JP | 59-54215 U | | 4/1984 |
| JP | 61-130608 | | 6/1986 |
| JP | 62-141918 U | | 9/1987 |
| JP | 11-193811 | | 7/1999 |
| JP | 11257334 A | * | 9/1999 |
| JP | 2000-179530 | | 6/2000 |
| JP | 2006-308025 | | 11/2006 |
| JP | 2007-285494 | | 11/2007 |

OTHER PUBLICATIONS

U.S. Appl. No. 12/413,218, filed Mar. 27, 2009, Takahashi, et al.
U.S. Appl. No. 12/413,191, filed Mar. 27, 2009, Takahashi, et al.
Office Action issued May 10, 2011 in Japan Application No. 2007-072505 (With English Translation).

* cited by examiner

*Primary Examiner* — Jonathan Liu
*Assistant Examiner* — Erin Smith
(74) *Attorney, Agent, or Firm* — Oblon, Spivak, McClelland, Maier & Neustadt, L.L.P.

(57) ABSTRACT

Disclosed herein is a suction cup, including: a suction cup body formed from gel and having at least one flat or convex face serving as a suction face; a shape retaining member provided on the suction cup body and having elasticity for restoring, when the suction cup body is deformed, the suction cup body so as to restore an original shape; and a center stem connected to the suction cup body and projecting from a portion of the suction cup body positioned remotely from a location of the suction cup body at which the suction face is provided in a direction intersecting with the center of the suction face.

14 Claims, 14 Drawing Sheets

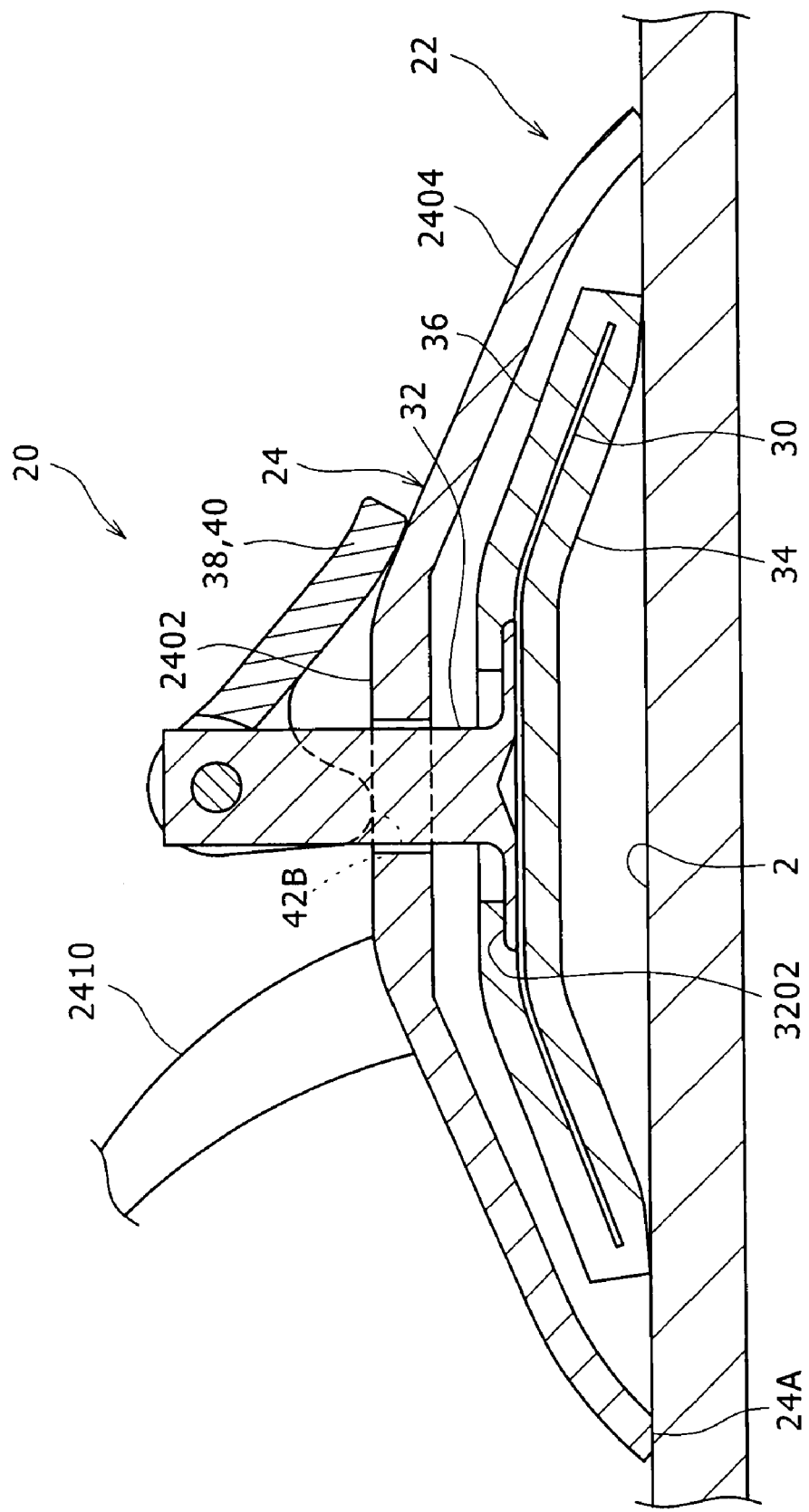

SUCTION CUP AND SUCTION CUP DEVICE

CROSS REFERENCES TO RELATED APPLICATIONS

The present invention contains subject matter related to Japanese Patent Application JP 2007-072505 filed in the Japan Patent Office on Mar. 20, 2007, the entire contents of which being incorporated herein by reference.

BACKGROUND OF THE INVENTION

1. Field of the Invention

This invention relates to a suction cup and a suction cup device.

2. Description of the Related Art

A suction cup is in the past known which is used to attach an article to a wall face indoors or a dashboard of an automobile.

In the past, a suction cup of the type mentioned is formed as a disk made of rubber or the like, and one of faces thereof in the thicknesswise direction serves as a suction face for attracting an attaching object face while the other face thereof serves as the back face.

The suction cup is attracted to an attaching object face if a central portion is pressed down toward the attaching object face with the suction face thereof opposed to the attaching object face. Thereupon, the space between the suction face and the attaching object face is placed into a substantially vacuum state, and the vacuum state is maintained by the elastic force of the suction cup (refer to Japanese Patent Laid-Open No. Hei 11-193811).

Meanwhile, where the attaching object face is formed as a leather-emboss face or as a fine uneven face or otherwise as a rough face, the close contactness between the suction face and the attaching object face cannot be maintained, and a gap is formed between the suction face and the attaching object face. Therefore, it is difficult to assure the close contactness by the suction cup.

Therefore, the assignee of the present application proposed a suction cup which can be closely contacted with the attaching object face even where the attaching object face is formed as a leather-emboss face or as a fine uneven face or else as a rough face. The suction face of the suction cup is formed from a gel layer. The suction cup mentioned is disclosed in Japanese Patent Laid-Open No. 2006-116359.

SUMMARY OF THE INVENTION

On the other hand, since the gel does not have elasticity and the gel itself cannot maintain its shape, in the suction cup which uses the gel layer described above, the gel layer is attached to an attaching face of the suction cup formed from rubber or the like.

Therefore, the suction cup has a thickness equal to the sum of the thickness of the gel layer and the thickness of a conventional suction cup and is disadvantageous in that it has an increased size.

Therefore, it is demanded to provide a suction cup and a suction cup device which can be closely attached to an attaching object face even where the attaching object face is formed as a leather-emboss face or as a fine uneven face or else as a rough face without increasing the size.

According to an embodiment of the present invention, there is provided a suction cup comprising a suction cup body formed from gel and having at least one flat or convex face serving as a suction face, a shape retaining member provided on the suction cup body and having elasticity for restoring, when the suction cup body is deformed, the suction cup body so as to restore an original shape thereof, and a center stem connected to the suction cup body and projecting from a portion of the suction cup body positioned remotely from a location of the suction cup body at which the suction face is provided in a direction intersecting with the center of the suction face.

According to another embodiment of the present invention, there is provided a suction cup device comprising a suction cup, an attaching base, and a displacement mechanism, the suction cup including a suction cup body formed from gel and having at least one flat or convex face serving as a suction face, a shape retaining member provided on the suction cup body and having elasticity for restoring, when the suction cup body is deformed, the suction cup body so as to restore an original shape thereof, and a center stem connected to the suction cup body and projecting from a back face of the suction cup body positioned remotely from a location of the suction cup body at which the suction face is provided in a direction intersecting with the center of the suction face, the attaching base having an attaching portion to which an article is to be attached, and a contacting portion capable of contacting with an outer circumferential portion of the back face of the suction cup body or with an attaching object face to which the suction face is attracted on the outer side with respect to the back face, the displacement mechanism being provided between the attaching base and the center stem in such a manner as to displace the center stem in a direction away from the suction face in a state wherein the suction face contacts closely with the attaching object face and the contracting portion contacts with the outer circumferential portion of the back face of the suction cup body or with the attaching object face to which the suction face is attracted on the outer side with respect to the back face.

With the suction cup and the suction cup device, since the portion of the suction cup including the suction face is formed from gel, not only where the attaching object face is formed as a flat face, but also where the attaching object face is formed as a leather-emboss face or as a fine uneven face or else as a rough face, the suction face deforms following up the convex and concave configuration. Consequently, the suction face can be closely attached to the uneven face or rough face without the intervention of a gap between the suction face and the uneven face. This is advantageous where it is tried to attach various articles with certainty to the attaching object face such as a leather-emboss face of a dashboard panel or the like.

Further, since the suction cup is not configured such that a gel layer made of gel is stacked on a suction cup body made of rubber but is configured such that the entire suction cup body including the suction face is formed from gel while the shape retaining member is provided simultaneously on the suction cup body to raise the retentivity of the shape of the suction cup body, the suction cup can be formed without increasing the thickness thereof, that is, without increasing the scale thereof. This is advantageous where it is tried to achieve miniaturization of the suction cup 22.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 12 is a cross sectional view showing a modified form of the suction cup device of FIG. 7;

DETAILED DESCRIPTION OF THE PREFERRED EMBODIMENTS

First Embodiment

Figure 1:
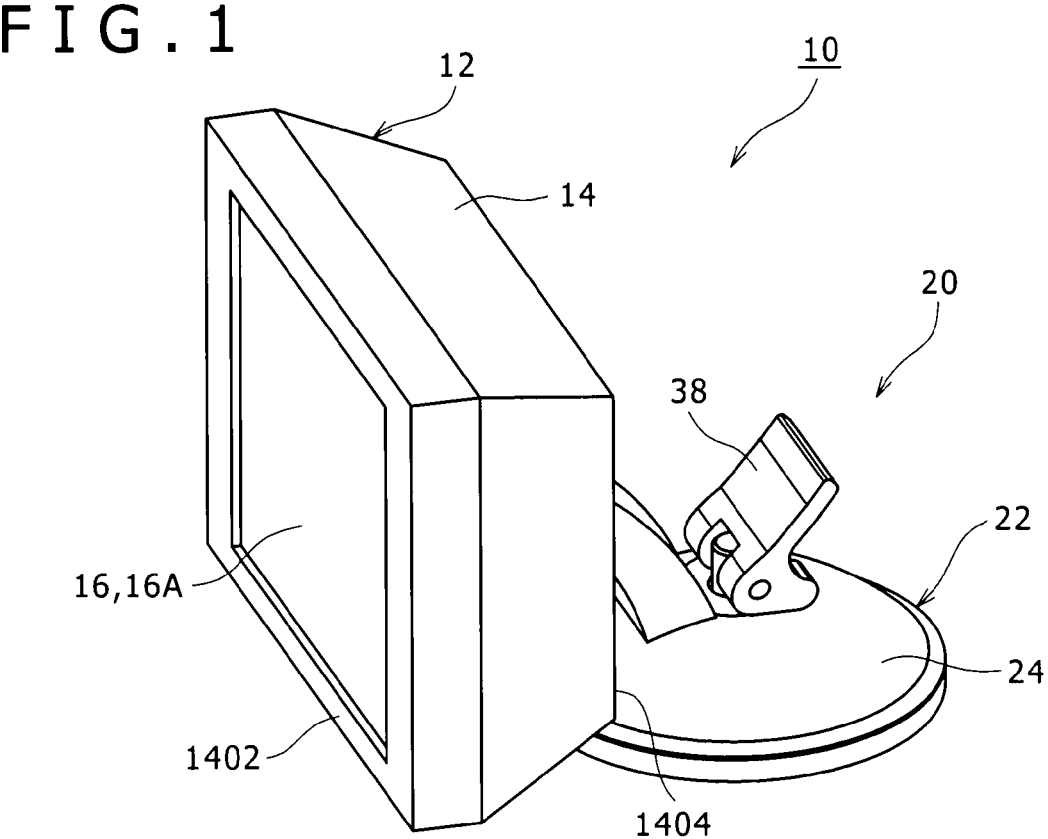
FIG. 1 is a perspective view of an electronic apparatus in which a suction cup device according to a first embodiment of the present invention.

Referring first to FIGS. 1 to 6, there is shown an electronic apparatus which includes an electronic apparatus 10 according to a first embodiment of the present invention is incorporated.

The electronic apparatus 10 includes an apparatus body 12 and a suction cup device 20 according to the present invention.

The apparatus body 12 is a display panel, for example, of a car navigation system or a television apparatus disposed on a dashboard within a cabin or a windshield of an automobile.

The apparatus body 12 includes a housing 14 in the form of a rectangular plate, and a display apparatus 16.

The display apparatus 16 is formed from a in the past known display apparatus such as a liquid crystal display apparatus or an organic EL display apparatus, and has a display screen 16A for displaying an image thereon.

The display screen 16A is incorporated in the housing 14 such that it is exposed forwardly through an opening provided on a front face 1402 of the housing 14.

The housing 14 is connected at a back face 1404 thereof to the suction cup device 20.

Figure 9A:
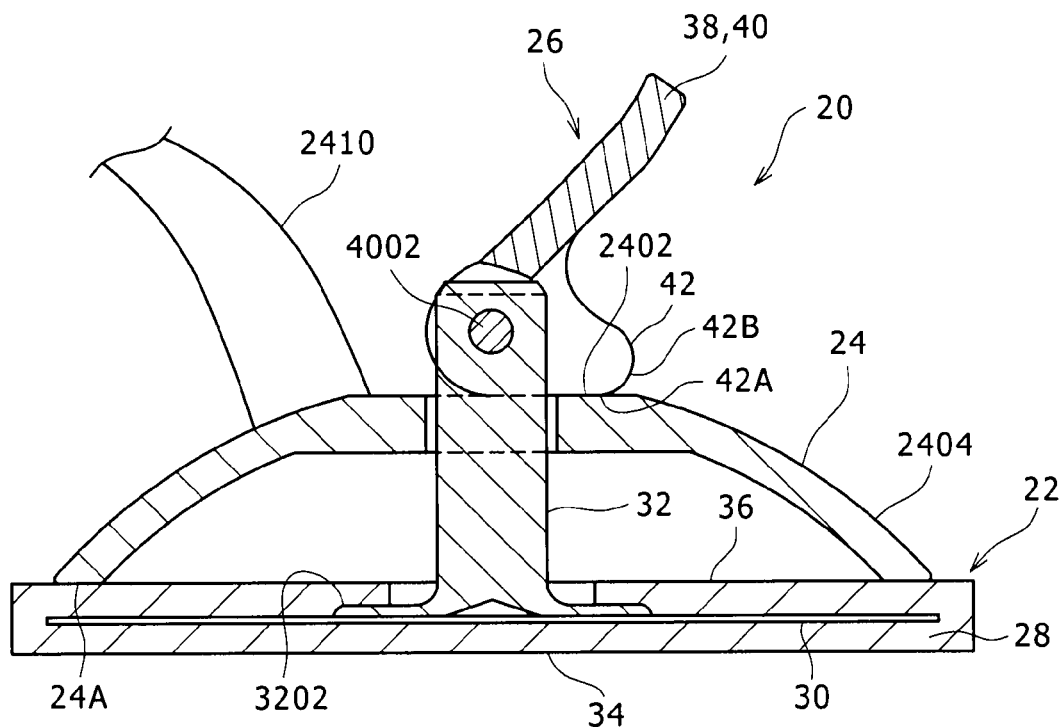
FIG. 9A is a cross sectional view showing the suction cup device of FIG. 7 in a non-attached state and FIG. 9B is a similar view but showing the suction cup device in an attached state.

The suction cup device 20 includes a suction cup 22, an attaching base 24, and a displacement mechanism 26 (refer to FIG. 9A).

The suction cup 22 includes a suction cup body 28, a shape retaining member 30, and a center stem 32.

Figure 10:
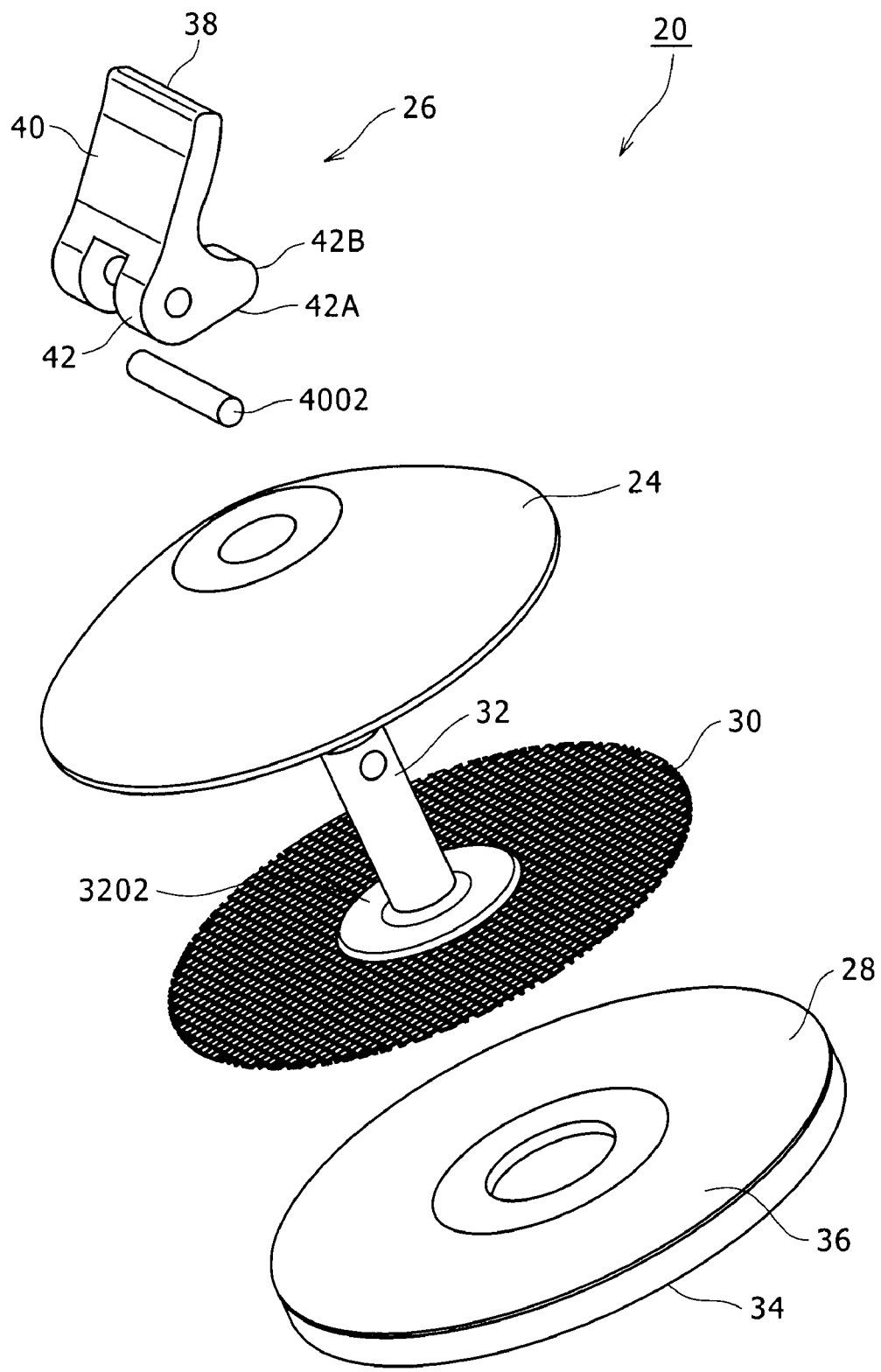
FIG. 10 is an exploded view of the suction cup device of FIG. 7.

The suction cup body 28 is made of gel and has a form of a plate as seen in FIG. 10. Particularly, in the present embodiment, the suction cup body 28 has a disk-like shape, and one of the opposite faces thereof in the thicknesswise direction is formed as a flattened suction face 34 while the other face is formed as a flattened back face 36.

For the gel mentioned above, synthetic resin-based gels such as polyethylene-based, styrene-based and silicon resin-based gels can be used. Further, as the polyethylene-base gel, for example, "COSMO SUPER GEL" by Cosmo Instruments Co., Ltd. which is an article on the market can be used. As the styrene-based gel, for example, "NAGFLEX" by Inoac Corporation which is an article on the market can be used. As the silicon-based gel, for example, "aGEL" (alpha gel) by GELTEC Co., Ltd. which is an article on the market can be used.

Though not shown, a piece portion for removing operation is provided on an outer edge of the suction cup body 28 such that it extends in a diametrically outward direction.

Referring to FIG. 9A, the center stem 32 extends in a direction away from the back face 36 along the axis of the suction face 34 from a central portion of the back face 36 of the suction cup body 28.

The center stem 32 is formed from a metal or a hard synthetic resin and has a flange 3202 in the form of a disk at a lower end thereof. The flange 3202 has a diameter greater than that of a stem portion of the center stem 32 and is embedded in a central portion of the suction cup body 28.

The shape retaining member 30 is provided to raise the retentivity of the shape of the suction cup body 28. In particular, since the suction cup body 28 is made of gel and the gel does not have the retentivity of the shape, the suction cup body 28 deforms into an arbitrary shape when it is not attached or used. Therefore, in the present embodiment, the suction cup body 28 is provided with the shape retaining member 30 so that the retentivity of the shape of the suction cup body 28 is raised to enhance the convenience in use of the suction cup device 20. For the shape retaining member 30, for example, a thin bar member or a thin plate member made of metal having no elasticity, a thin bar member or a thin plate member made of a metal material or a non-metal material having elasticity or a like member may be used.

In the present embodiment, for the shape retaining member 30, a material having elasticity for biasing, when the suction cup body 28 is deformed, the suction cup body 28 in a direction in which the suction cup body 28 restores its original shape other than rubber is used so that, when the suction cup device 20 is not used, the suction cup body 28 may restore or keep its original shape to enhance the convenience in use of the suction cup device 20.

Referring to FIGS. 9A and 10, the shape retaining member 30 has a central portion positioned at a central portion of the suction cup body 28 and having a shape of a disk corresponding to the suction cup body 28 and extending on a plane, and an annular portion positioned at a remaining annular portion of the suction cup body 28 other than the central portion. It is to be noted that, since, in the present embodiment, the flange 3202 is positioned at a central portion of the suction cup body 28, the shape retaining member 30 may have only the annular portion positioned on the remaining annular portion of the suction cup body 28 other than the central portion.

The shape retaining member 30 is formed from a net-like member formed from thin bar members or thin wire members having elasticity and braided into a net.

For such a shape retaining member 30 as described above, for example, a metal material such as, for example, stainless steel can be adopted. Or, a nonmetal material such as a carbon material or a fiber-reinforced plastic material can be adopted. The materials mentioned are higher in hardness and modulus of elasticity than natural rubber and synthetic rubber of which conventional suction cups are made. Where the shape retaining member 30 is made of any of the materials mentioned, it can be made with a reduced thickness when compared with that which is made of natural rubber or synthetic rubber of which conventional suction cups are made. This is advantageous where it is tried to reduce the thickness of the suction cup 22.

Figure 9B:
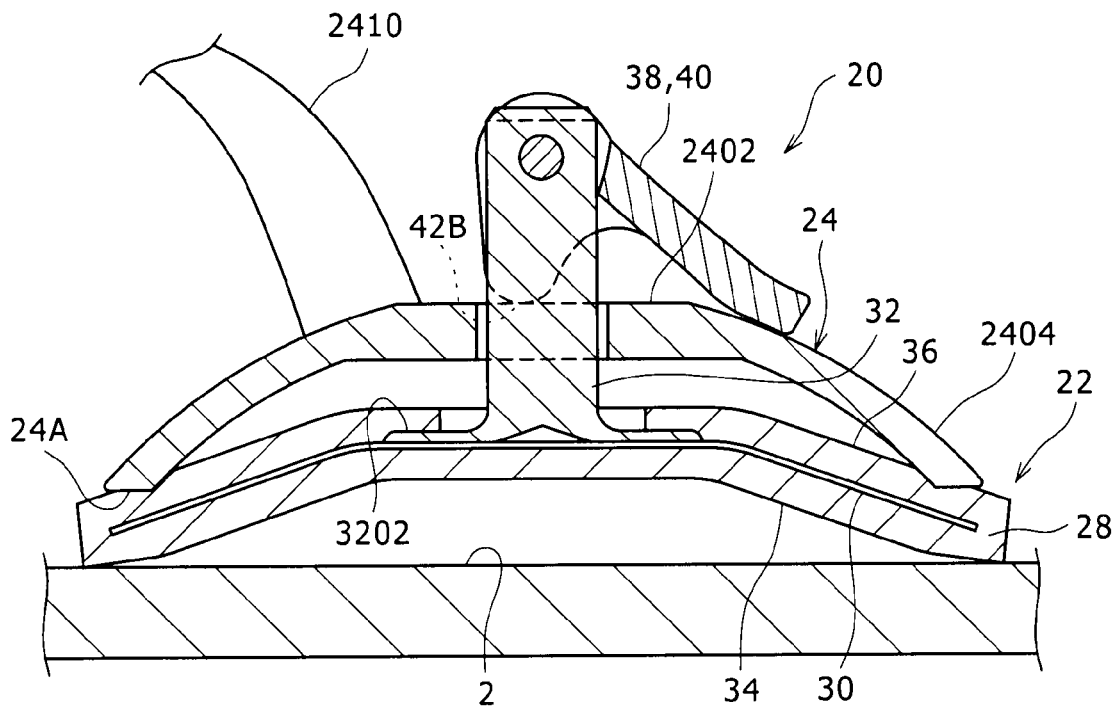
Figure 11A:
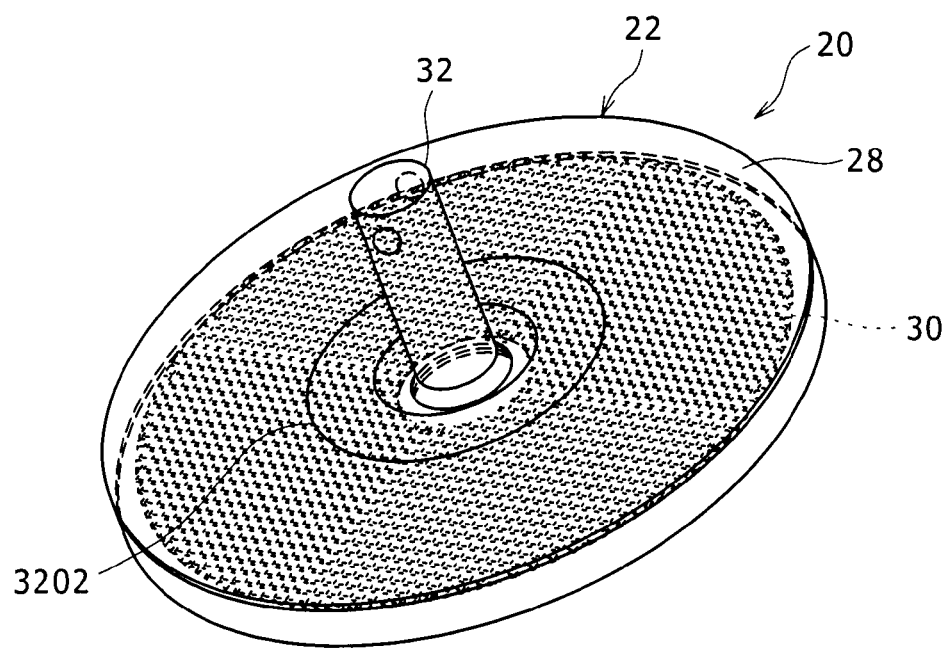
FIGS. 11A and 11B are a perspective view and a plan view, respectively, of the suction cup device of FIG. 7.
Figure 11B:
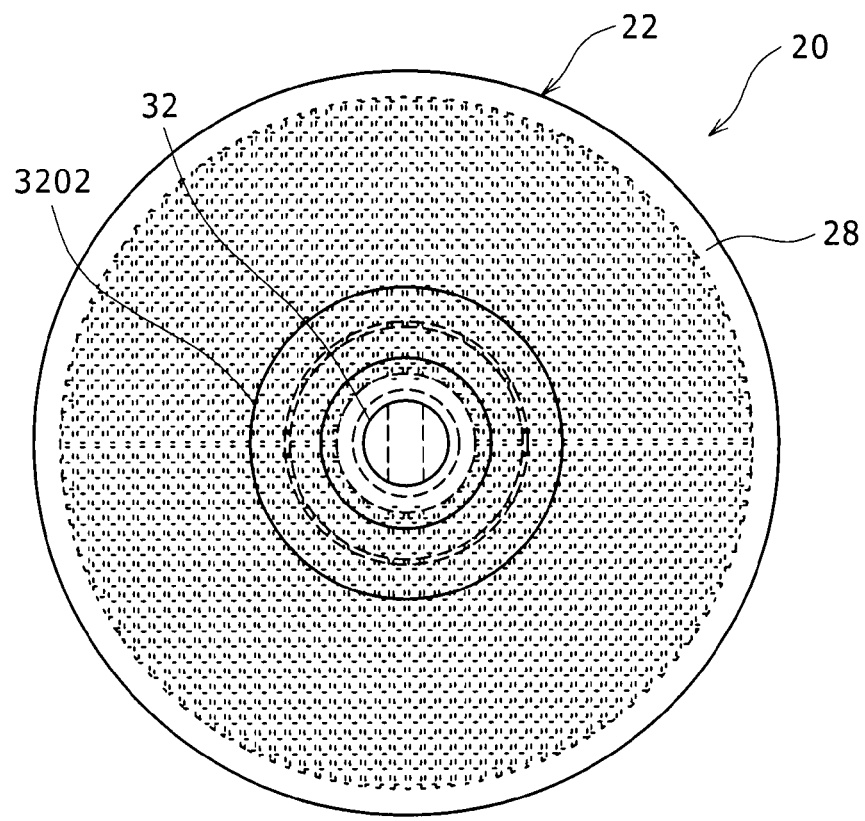

The shape retaining member 30 is embedded in the inside of the suction cup body 28 as seen in FIGS. 11A and 11B, and the lower face of the flange 3202 of the center stem 32 and a central portion of the shape retaining member 30 are connected to each other as seen in FIGS. 9A and 9B.

Figure 2:
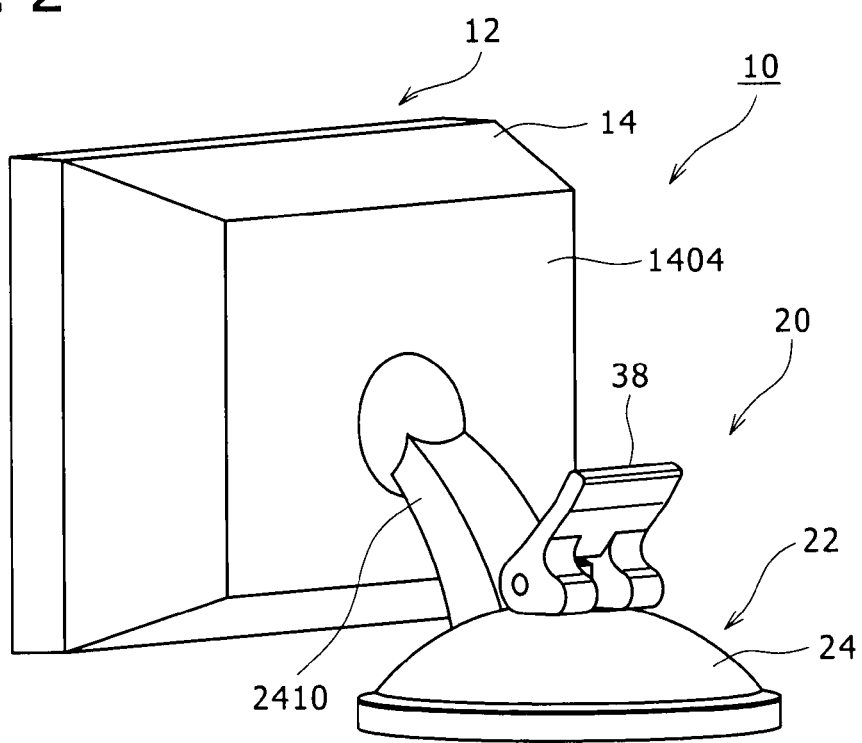
FIG. 2 is a perspective view of the electronic apparatus of FIG. 1 but as viewed in a different direction.
Figure 3:
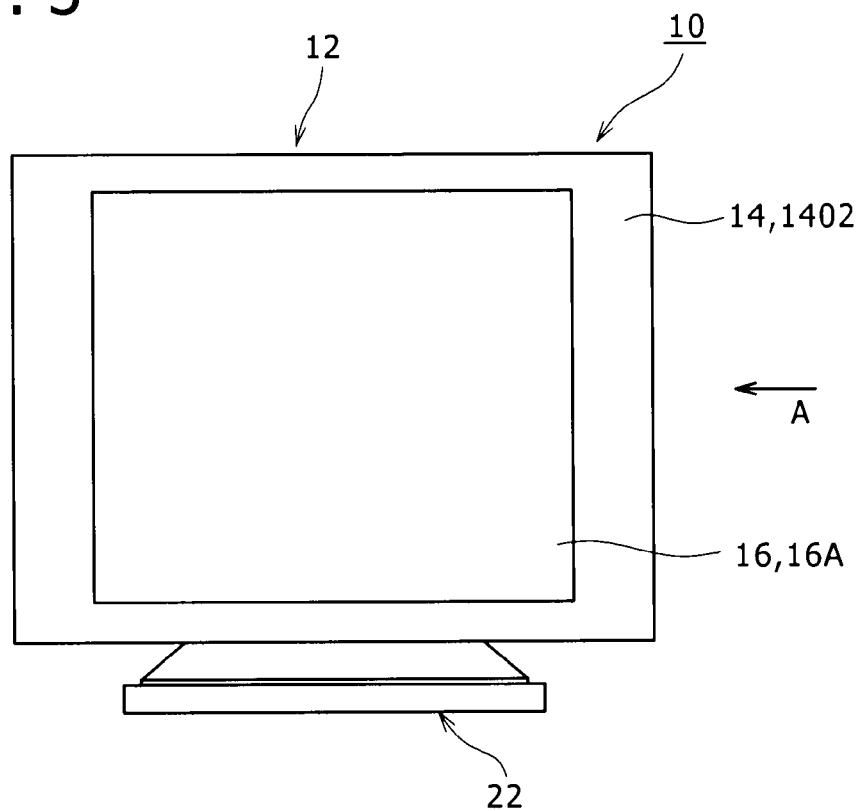
FIG. 3 is a front elevational view of the electronic apparatus of FIG. 1.
Figure 4:
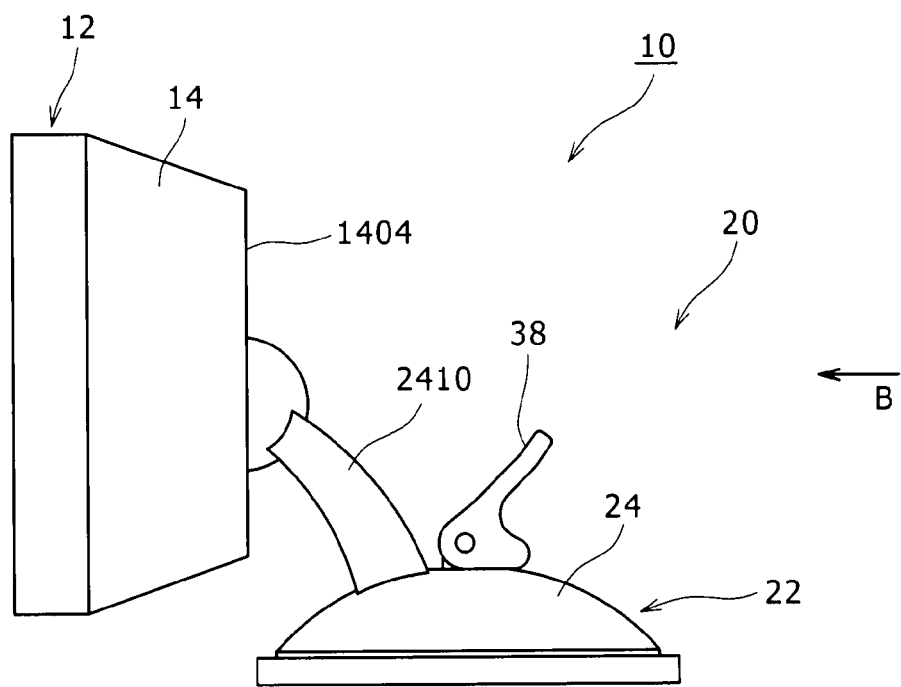
FIG. 4 is a view of the electronic apparatus of FIG. 1 as viewed in a direction indicated by an arrow mark A of FIG. 3.
Figure 5:
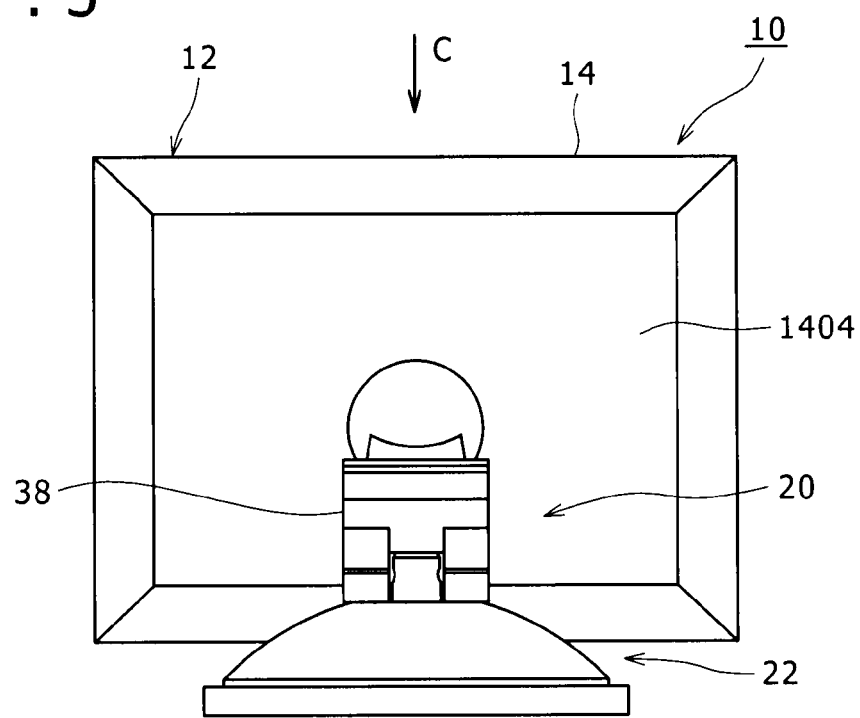
FIG. 5 is a view of the electronic apparatus of FIG. 1 as viewed in a direction indicated by an arrow mark B of FIG. 4.
Figure 6:
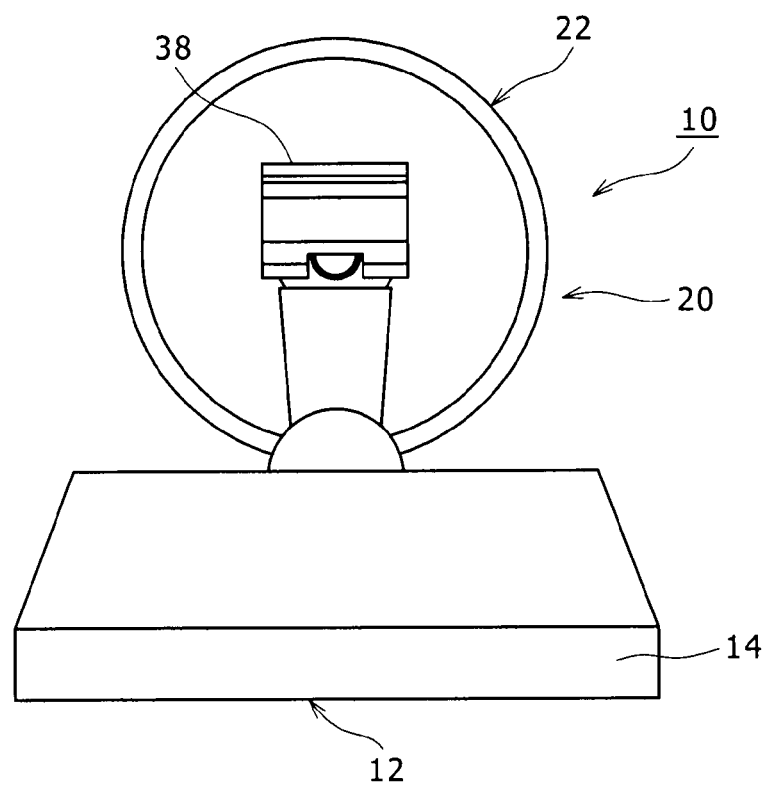
FIG. 6 is a view of the electronic apparatus of FIG. 1 as viewed in a direction indicated by an arrow mark C of FIG. 5.
Figure 7:
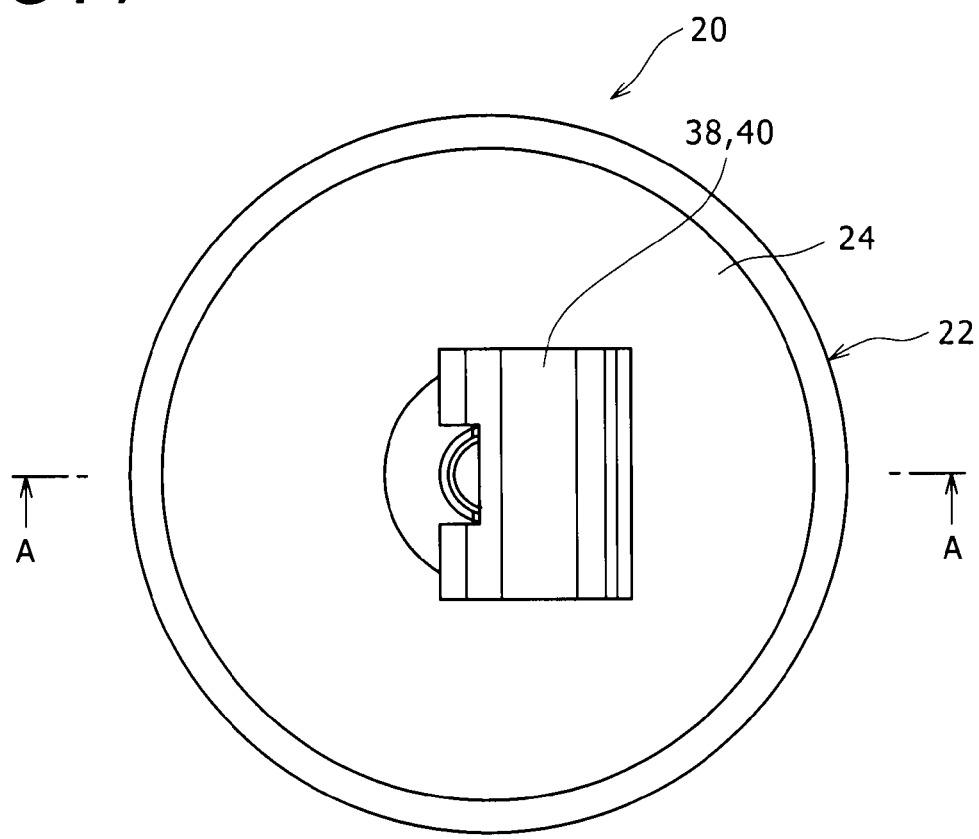
FIG. 7 is a plan view of the suction cup device shown in FIG. 1.
Figure 8:
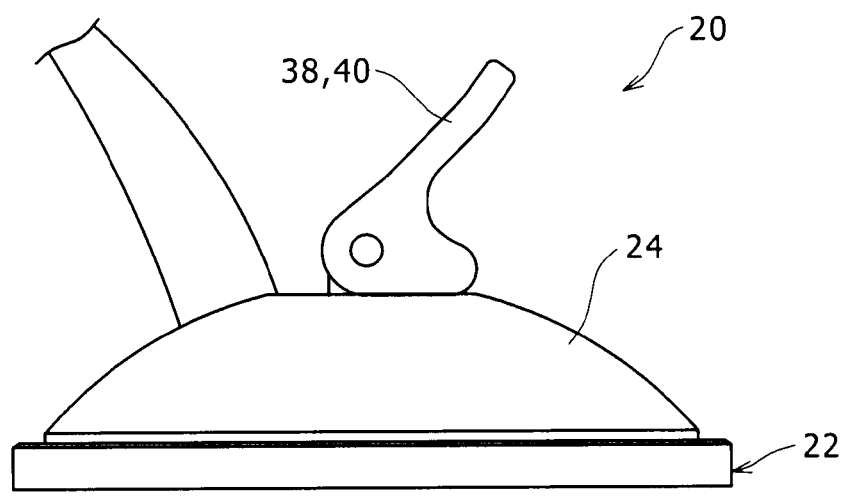
FIG. 8 is a front elevational view of the suction cup device shown in FIG. 1.

Referring to FIGS. 2 and 4, the attaching base 24 receives an article to be attached to an attaching object face 2 through the suction cup 22 which is attracted to the attaching object face 2.

Referring to FIG. 9B, the attaching base 24 has a flat circular central portion 2402, a curved portion 2404 provided around the central portion 2402, and an attaching portion 2410, and has a shape convex in a direction away from the suction cup body 28.

In the present embodiment, the attaching portion 2410 is formed from an arm provided so as to project from a location on the boundary between the central portion 2402 and the curved portion 2404. The arm or attaching portion 2410 is connected at an end thereof to the back face 1404 of the housing 14 as seen in FIG. 2 and FIG. 4.

In the present embodiment, an outer circumference of the curved portion 2404 serves as a contacting portion 24A which can contact with an outer circumferential portion of the back face 36 of the suction cup body 28.

It is to be noted that the contacting portion 24A may otherwise be formed for contact with the attaching object face 2 to which the suction face 34 is attracted on the outer side of the suction face 34 as seen in FIG. 12.

Referring to FIGS. 9A and 9B, the displacement mechanism 26 is provided between the attaching base 24 and the center stem 32 such that it displaces the center stem 32 in a direction away from the suction face 34 in a state wherein the suction face 34 contacts closely with the attaching object face 2 and the contacting portion 24A contacts with the outer circumference of the back face 36 of the suction cup 22 or with the attaching object face 2 to which the suction face 34 is attracted on the outer side with respect to the back face 36.

In the present embodiment, the displacement mechanism 26 includes a lock lever 38.

The lock lever 38 has a handle 40 and a cam 42. The handle 40 is connected at a base portion thereof for rocking motion to an upper end of the center stem 32 through a pivot 4002.

The cam 42 has a first cam portion 42A and a second cam portion 42b.

FIG. 9A shows the handle 40 in an upright state, in which the first cam portion 42A contacts with the central portion 2402 of the attaching base 24. In this state, the suction cup body 28 exhibits a form of a flat plate, and the contacting portion 24A of the attaching base 24 contacts with the outer circumference of the back face 36 of the suction cup 22.

FIG. 9B shows the handle 40 in a pivoted down state, in which the second cam portion 42b contacts with the central portion 2402 of the attaching base 24. In this state, the center stem 32 is compulsorily displaced in a direction away from the suction face 34.

Now, action and effects of the suction cup device 20 are described.

The handle 40 is placed into the upright state, and the suction cup body 28 is pressed against the attaching object face 2 with the suction face 34 thereof opposed to the attaching object face 2 so that the suction face 34 and the attaching object face 2 are closely contacted with each other.

Then, the handle 40 is placed into the pivoted down state. Thereupon, since the contacting portion 24A remains in contact with the outer circumference of the back face 36 of the suction cup 22, the center stem 32 is displaced in a direction away from the suction face 34, whereupon the central portion 2402 of the suction cup body 28 is displaced away from the attaching object face 2 to place the space between the suction face 34 and the attaching object face 2 into a vacuum state thereby to raise the close contactness of the suction cup body 28 with the attaching object face 2. Consequently, the apparatus body 12 is attracted in a stable state to the attaching object face 2.

Accordingly, with the suction cup device 20 of the present embodiment, since the suction cup body 28 is formed from gel, not only where the attaching object face 2 is a flat face, but also where the attaching object face 2 is formed as a leather-emboss face or as a fine uneven face or else as a rough face, the suction face 34 deforms following up the uneven configuration of the attaching object face 2. Consequently, the suction face 34 can be closely attached to the uneven face or rough face without the intervention of a gap between the suction face 34 and the uneven face. This is advantageous where it is tried to attach various articles with certainty to the attaching object face such as a leather-emboss face of a dashboard panel or the like.

Further, since the suction cup 22 is not configured such that a gel layer made of gel is stacked on a suction cup body made of rubber but is configured such that the entire suction cup body 28 including the suction face 34 is formed from gel while the shape retaining member 30 is provided simultaneously on the suction cup body 28 to raise the retentivity of the shape of the suction cup body 28, the suction cup 22 can be formed without increasing the thickness thereof, that is, without increasing the scale thereof. This is advantageous where it is tried to achieve miniaturization of the suction cup 22.

Second Embodiment

Figure 13A:
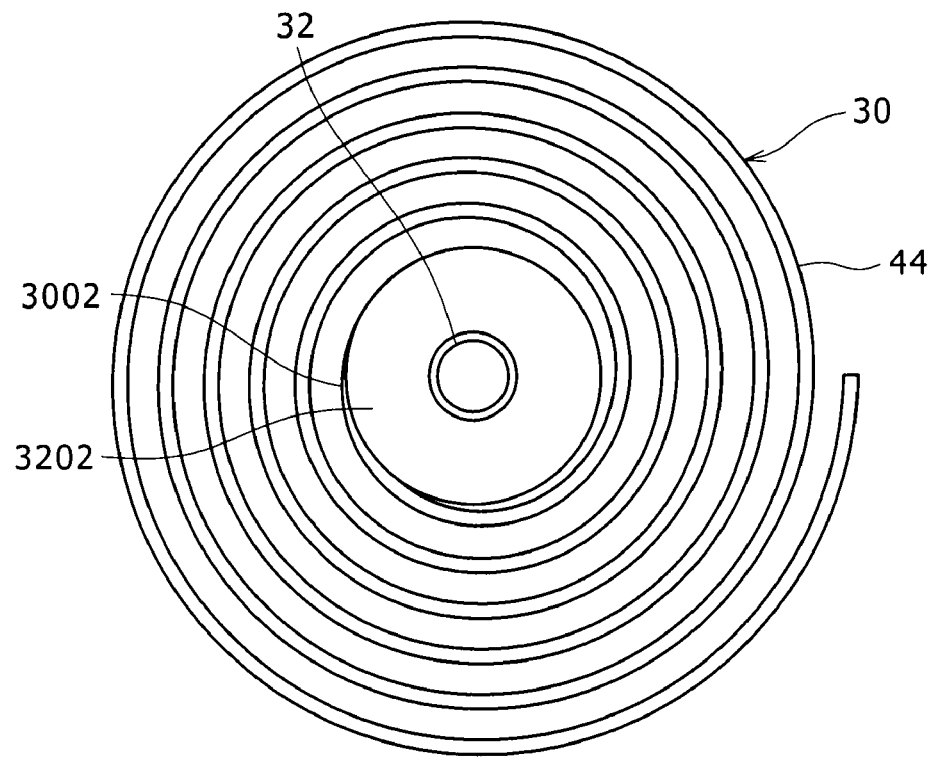
FIG. 13A is a plan view of a shape retaining member for a suction cup according to a second embodiment of the present invention and FIG. 13B is a perspective view of a suction cup including the shape retaining member of FIG. 13A.
Figure 13B:
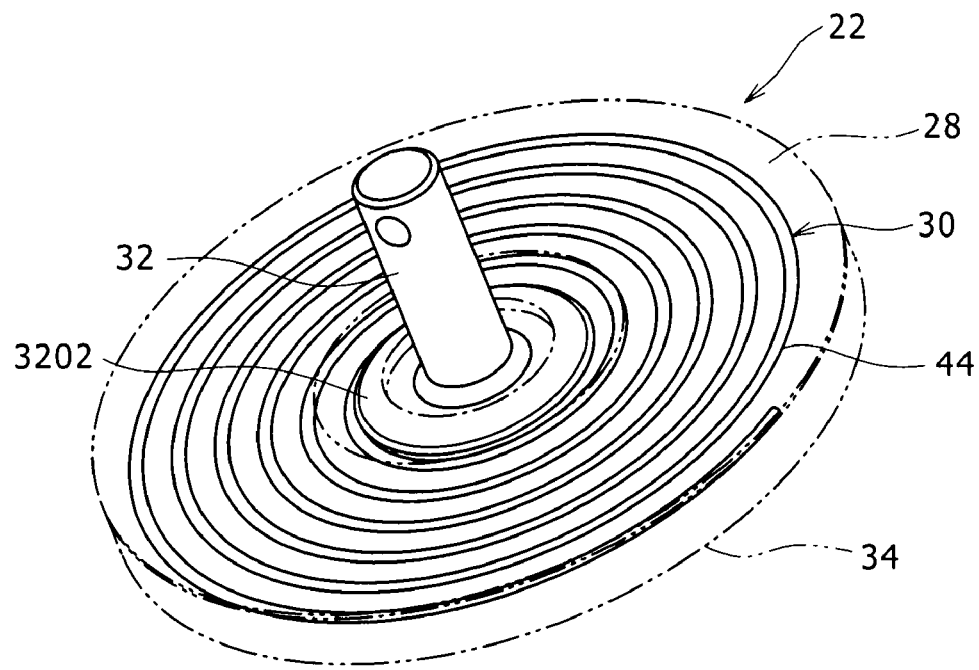

FIG. 13A shows a shape retaining member 30 according to a second embodiment of the present invention, and FIG. 13B shows a suction cup 22 in which the shape retaining member 30 is incorporated.

It is to be noted that the shape retaining member 30 according to the second and other embodiments of the present invention described below is incorporated in the suction cup 22 which is incorporated in the suction cup device 20 and hence in the electronic device 10 described hereinabove with reference to FIGS. 1 to 6 similarly to the shape retaining member 30 according to the first embodiment of the present invention. Therefore, in the description of the second and other embodiments of the present invention, description is given principally of the shape retaining member 30.

Referring to FIGS. 13A and 13B, the shape retaining member 30 according to the second embodiment is formed such that a bar-like member 44 having elasticity which may be formed from a thin wire member or a thin plate member is coiled spirally along a plane parallel to the axis of a suction face 34. The bar-like member 44 may be made of a material same as that used in the first embodiment.

Similarly as in the first embodiment, the shape retaining member 30 is connected at a central portion 3002 thereof to the flange 3202 at the lower end of the center stem 32, and the flange 3202 is embedded in the inside of the suction cup body 28 together with the lower end of the center stem 32.

Also with the suction cup 22 in which the shape retaining member 30 according to the second embodiment is used, similar effects to those of the first embodiment are achieved.

Third Embodiment

Figure 14A:
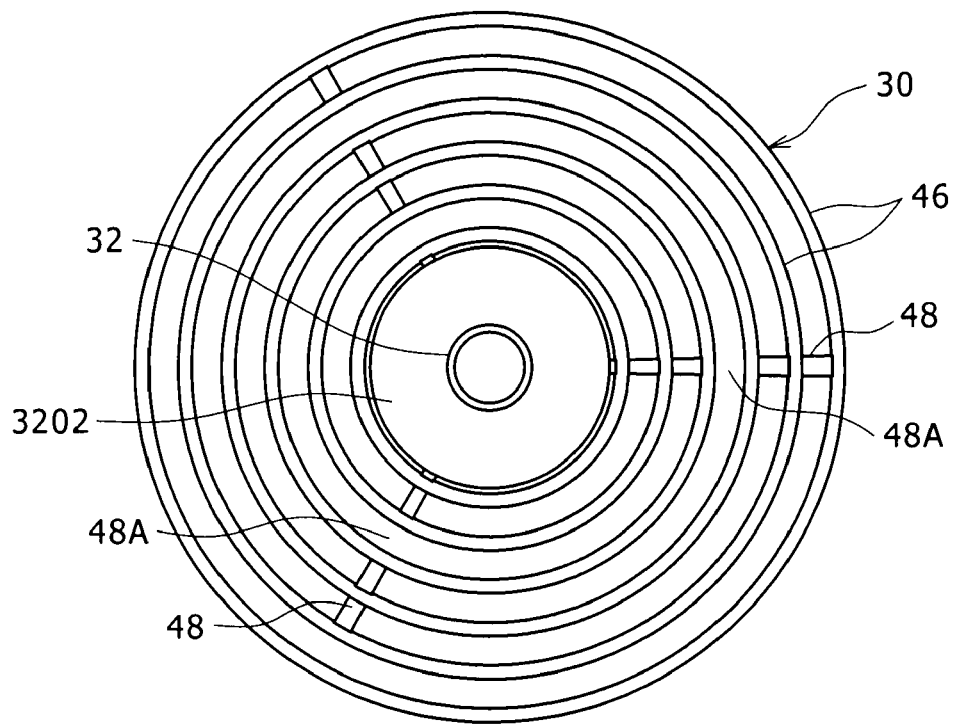
FIG. 14A is a plan view of a shape retaining member for a suction cup according to a third embodiment of the present invention and FIG. 14B is a perspective view of a suction cup including the shape retaining member of FIG. 14A.
Figure 14B:
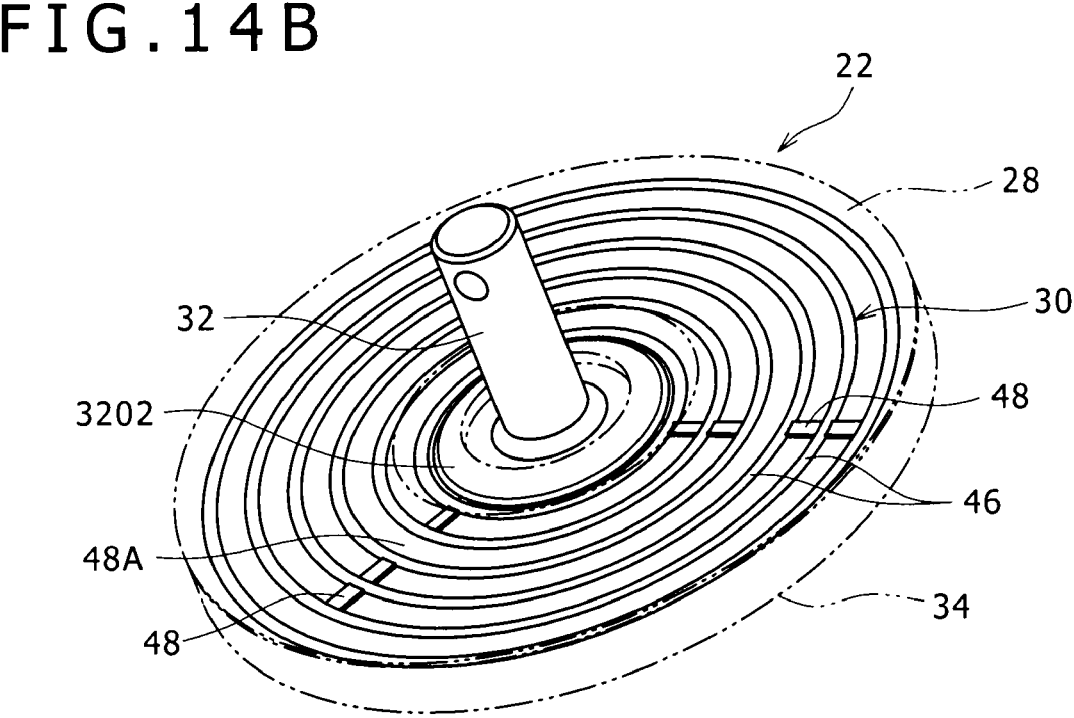

FIG. 14A shows a shape retaining member 30 according to a third embodiment of the present invention, and FIG. 14B shows a suction cup 22 in which the shape retaining member 30 is incorporated.

Referring to FIGS. 14A and 14B, the shape retaining member 30 according to the third embodiment includes a plurality of annular members 46 and a plurality of connecting members 48.

The annular members 46 are each formed from a thin wire member or a thin plate member having elasticity and are disposed concentrically on the axis of the suction face 34. The annular members 46 have different diameters from each other.

The connecting members 48 are provided at locations spaced from each other in a circumferential direction of the suction cup body 28, extend radially from a central portion of the suction face 34 toward the outer circumference of the suction cup body 28 and connect the annular members 46.

Each of the connecting members 48 has a cutaway portion 48A at which it does not connect adjacent ones of the annular members 46. The cutaway portions 48A are provided so as to adjust the elasticity of the shape retaining member 30.

The annular members 46 and the connecting members 48 are made of a material similar to that used in the first embodiment.

Similarly as in the first embodiment, the shape retaining member 30 is connected at the lower end of the center stem 32 thereof to the flange 3202 of the center stem 32, and the annular members 46 are connected to the flange 3202 through the connecting members 48. The shape retaining member 30 is embedded in the inside of the suction cup body 28 together with the lower end of the center stem 32.

Also with the suction cup 22 in which the shape retaining member 30 according to the third embodiment described above is used, similar effects to those of the first embodiment are achieved.

Fourth Embodiment

Figure 15A:
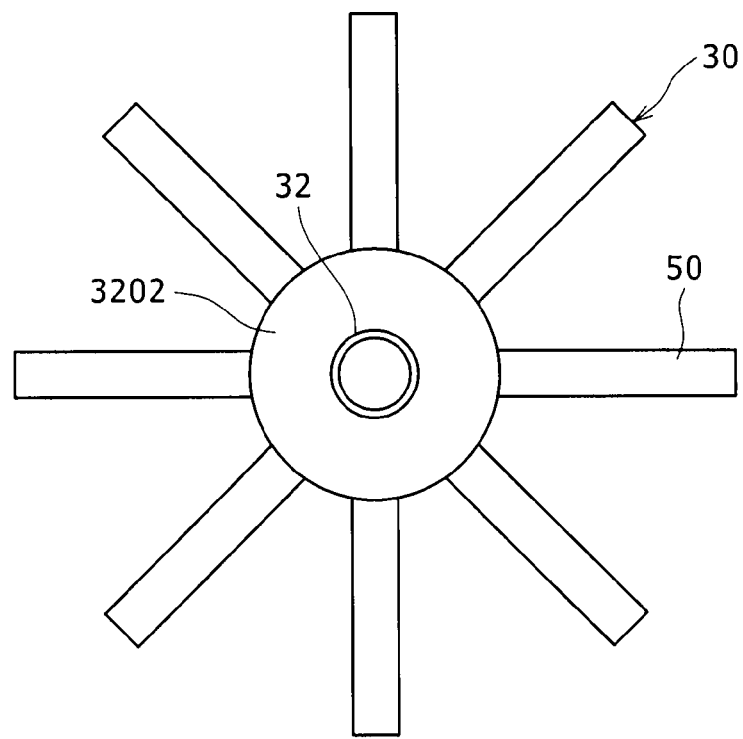
FIG. 15A is a plan view of a shape retaining member for a suction cup according to a fourth embodiment of the present invention and FIG. 15B is a perspective view of a suction cup including the shape retaining member of FIG. 15A.
Figure 15B:
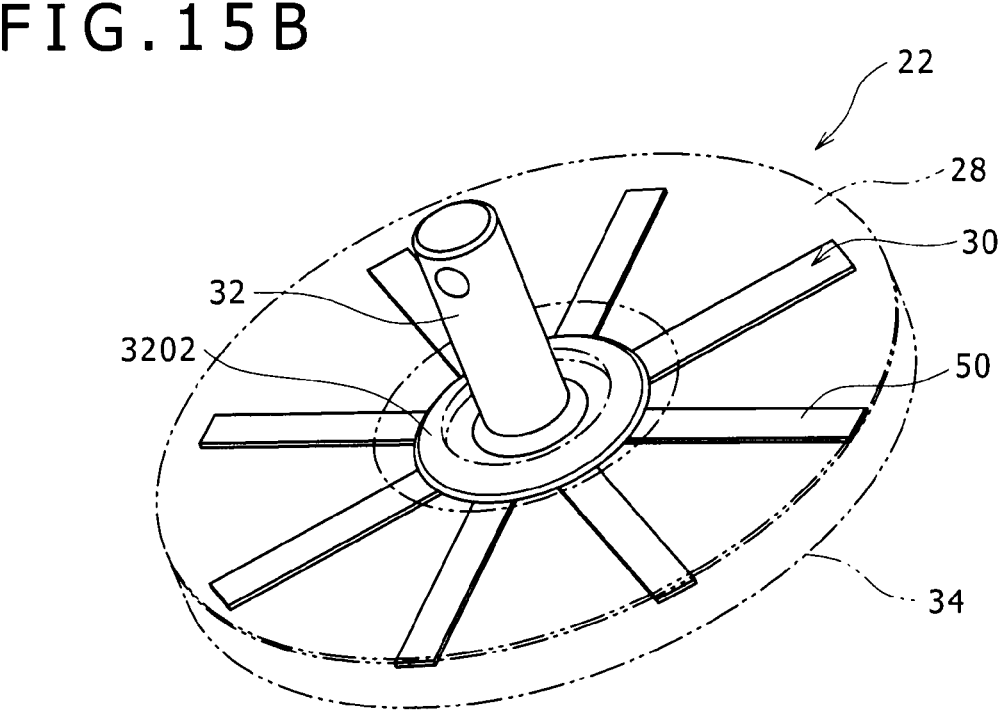

FIG. 15A shows a shape retaining member 30 according to a fourth embodiment of the present invention, and FIG. 15B shows a suction cup 22 in which the shape retaining member 30 is incorporated.

Referring to FIGS. 15A and 15B, the shape retaining member 30 in the fourth embodiment includes a plurality of piece members 50 formed from a thin plate member having elasticity and individually extending radially outwardly from a central portion of the suction cup body 28 toward the outer circumference of the suction cup body 28 along a plane perpendicular to the axis of the suction face 34.

Such a plate member having elasticity as just described may be made of a metal material such as, for example, stainless steel or made of a non-metal material such as a carbon material or a fiber-reinforced plastic material.

Portions of the piece members 50 positioned at the central portion of the suction cup body 28 are connected to the flange 3202 at the lower end of the center stem 32.

The shape retaining member 30 is embedded in the inside of the suction cup body 28 together with the lower end of the center stem 32 similarly as in the first embodiment.

Also with the suction cup 22 in which the shape retaining member 30 according to the fourth embodiment is used, similar effects to those of the first embodiment are achieved.

Fifth Embodiment

Figure 16A:
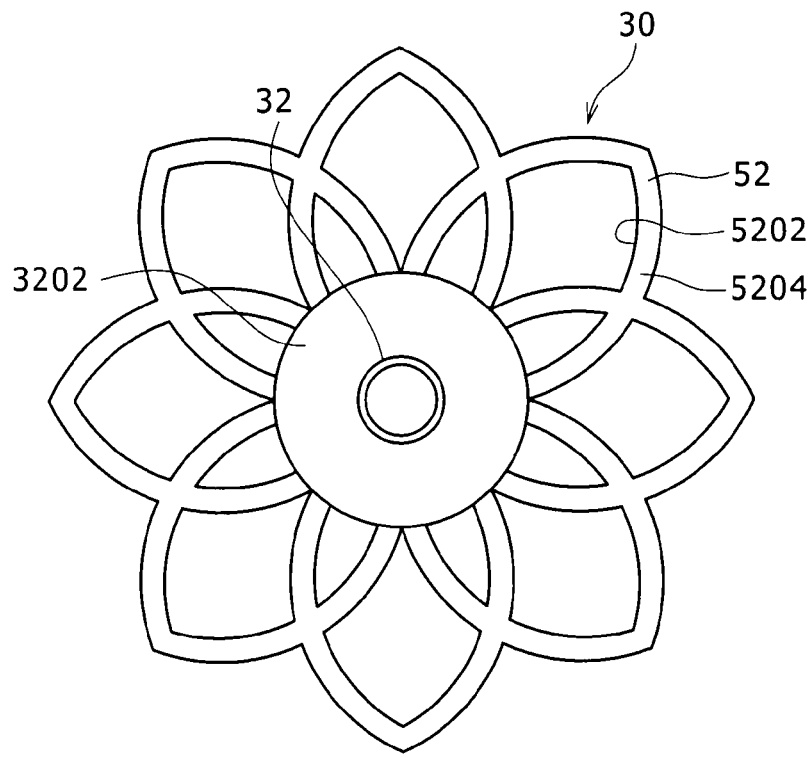
FIG. 16A is a plan view of a shape retaining member for a suction cup according to a fifth embodiment of the present invention and FIG. 16B is a perspective view of a suction cup including the shape retaining member of FIG. 16A.
Figure 16B:
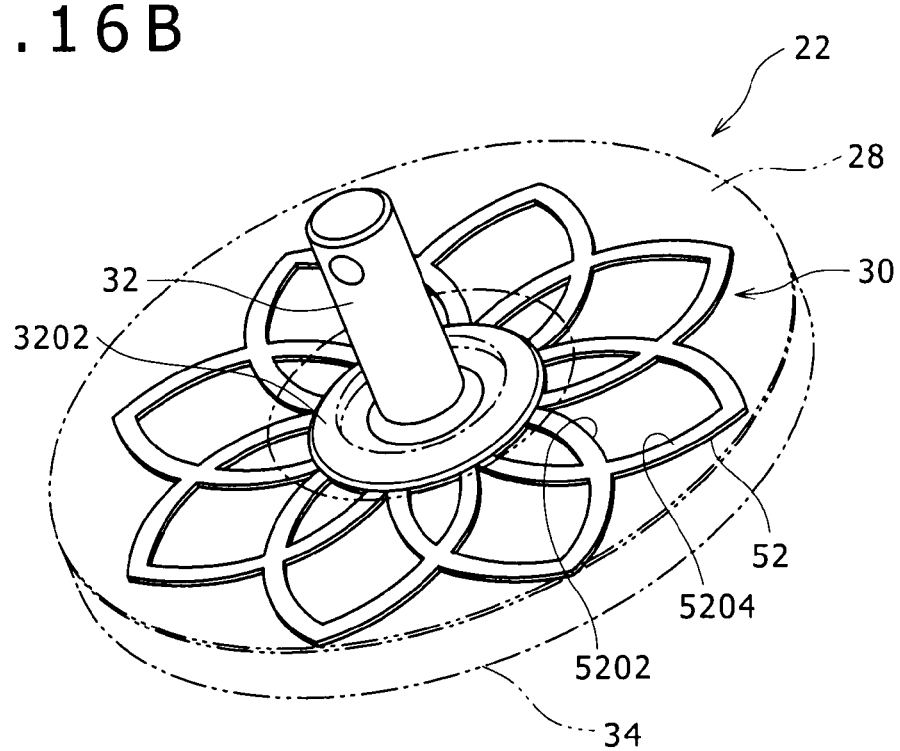

FIG. 16A shows a shape retaining member 30 according to a fifth embodiment of the present invention, and FIG. 16B shows a suction cup 22 in which the shape retaining member 30 is incorporated.

Referring to FIGS. 16A and 16B, the shape retaining member 30 in the fifth embodiment is formed from a thin plate member having elasticity and has a piece member 52 extending along a plane parallel to the axis of the suction face 34. The plate member may be made of a material similar to that in the fourth embodiment.

The piece member 52 has a plurality of openings 5202 and is formed from a plurality of narrow pieces 5204 of a small width which rim the openings 5202 such that it is generally shaped such that it looks as a kind of flower when it is viewed in plan.

A portion of the piece member 52 which is positioned at a central portion of the suction cup body 28 is connected to the flange 3202 at the lower end of the center stem 32.

The shape retaining member 30 is embedded in the inside of the suction cup body 28 together with the lower end of the center stem 32 similarly as in the first embodiment.

Also with the suction cup 22 in which the shape retaining member 30 according to the fifth embodiment is used, similar effects to those of the first embodiment are achieved.

Further, in the present embodiment, if the suction cup body 28 is made of transparent gel, then the shape of the shape retaining member 30 can be visually observed, and this is advantageous when it is tried to enhance the appearance of the suction cup 22. In this instance, if the shape retaining member 30 is colored, for example, in red, yellow or green, this is further advantageous where it is tried to enhance the appearance of the suction cup 22.

Sixth Embodiment

Figure 17A:
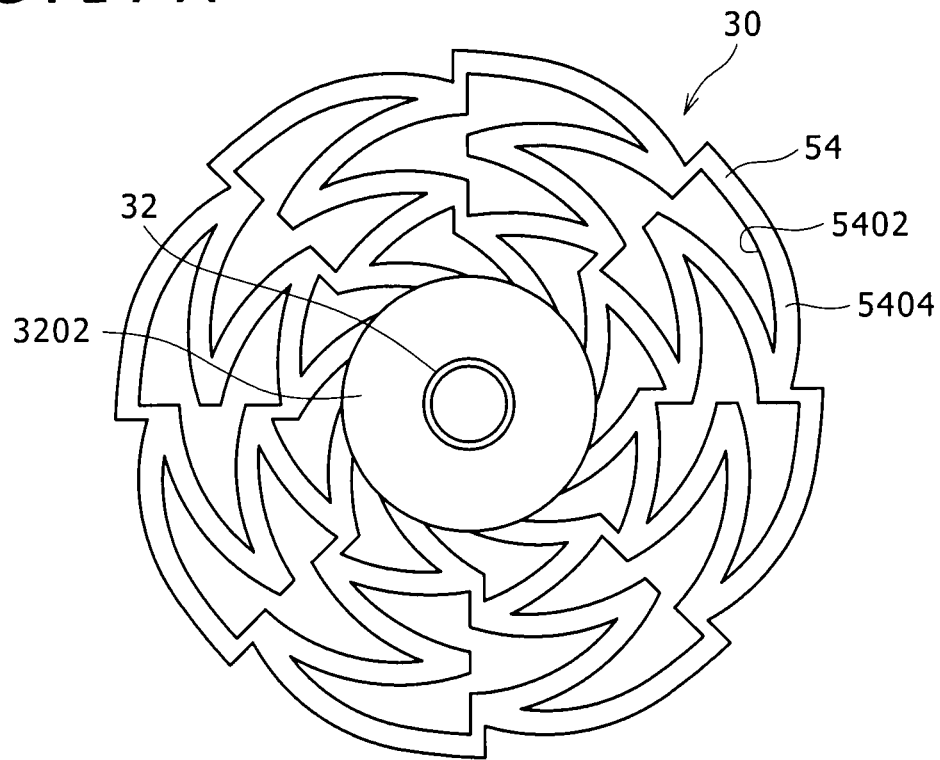
FIG. 17A is a plan view of a shape retaining member for a suction cup according to a sixth embodiment of the present invention and FIG. 17B is a perspective view of a suction cup including the shape retaining member of FIG. 17A.
Figure 17B:
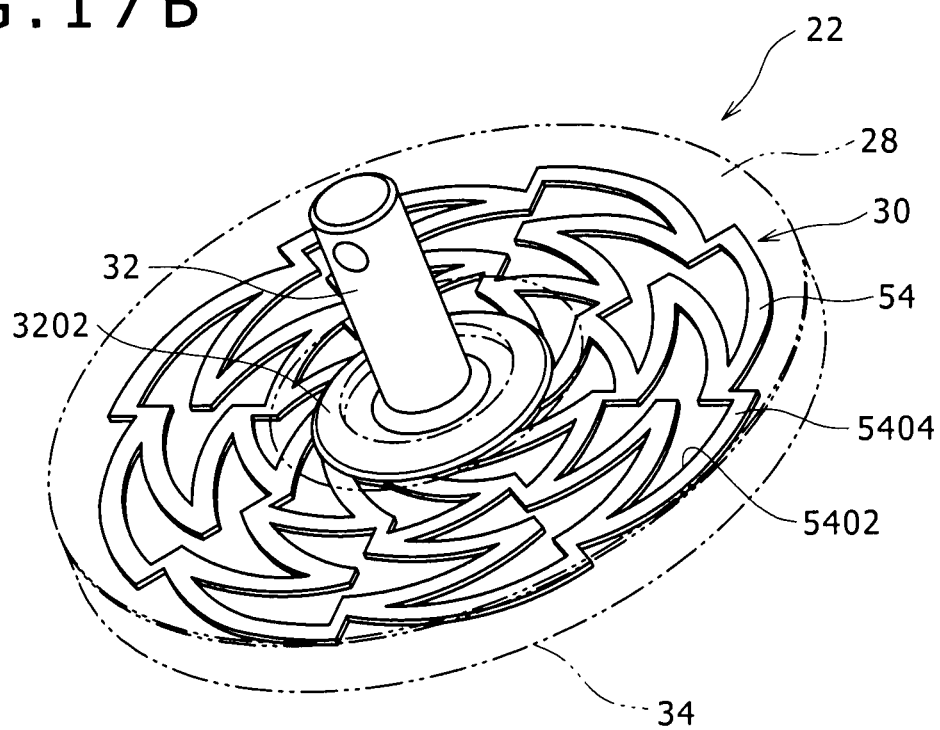

FIG. 17A shows a shape retaining member 30 according to a sixth embodiment of the present invention, and FIG. 17B shows a suction cup 22 in which the shape retaining member 30 is incorporated.

Referring to FIGS. 17A and 17B, the shape retaining member 30 according to the sixth embodiment has a piece member 54 formed from a thin plate member extending along a plane perpendicular to the axis of the suction face 34. The plate member may be made of a material similar to that used in the fourth embodiment described hereinabove.

The piece member 54 has a plurality of openings 5402 and is formed from a plurality of narrow pieces 5404 of a small width which define the openings 5402 such that it is generally shaped such that it looks as a geometrical pattern when it is viewed in plan.

A portion of the piece member 54 positioned at a central portion of the suction cup body 28 is connected to the flange 3202 at the lower end of the center stem 32.

The shape retaining member 30 is embedded in the inside of the suction cup body 28 together with the lower end of the center stem 32 similarly as in the first embodiment.

Also with the suction cup 22 in which the shape retaining member 30 according to the sixth embodiment is used, similar effects to those of the first embodiment are achieved.

Further, also in the present embodiment, if the suction cup body 28 is made of transparent gel, then the shape of the shape retaining member 30 can be visually observed similarly as in the fifth embodiment described hereinabove, and this is advantageous when it is tried to enhance the appearance of the suction cup 22. In this instance, if the shape retaining member 30 is colored, for example, in red, yellow or green, this is further advantageous where it is tried to enhance the appearance of the suction cup 22.

Seventh Embodiment

Figure 18:
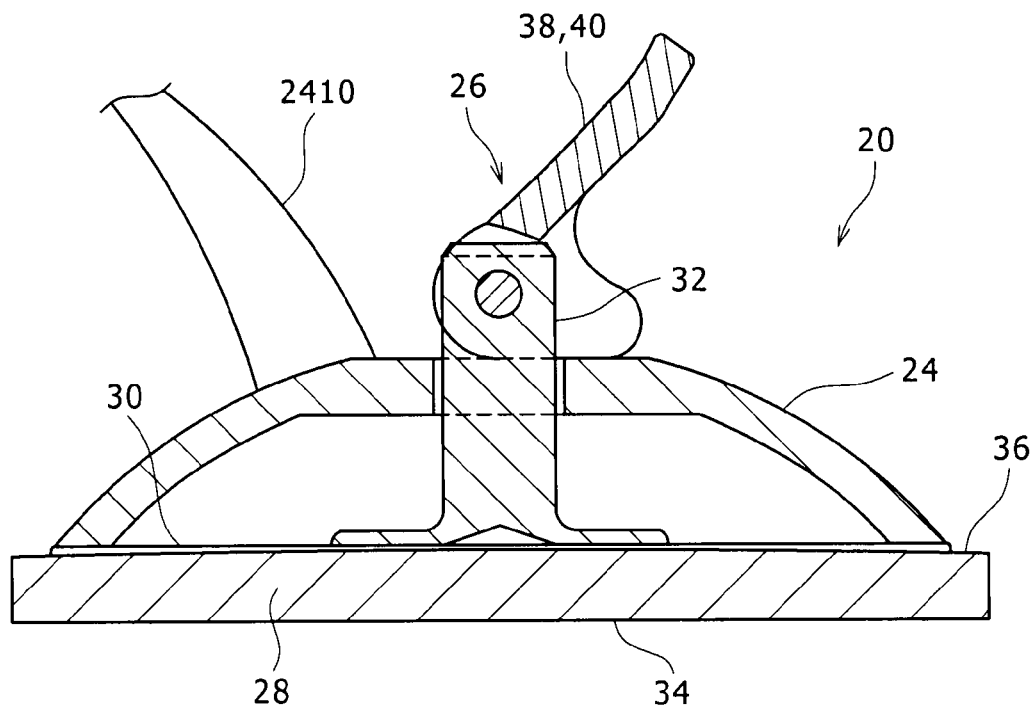
FIG. 18 is a cross sectional view showing a suction cup device according to a seventh embodiment of the present invention in a non-attached state.

FIG. 18 shows a suction cup device 20 according to a seventh embodiment of the present invention which is in a non-attached state.

Referring to FIG. 18, the shape retaining member 30 according to the seventh embodiment is formed similarly to that in the first embodiment, and the flange 3202 at the lower end of the center stem 32 and the shape retaining member 30 formed from a net-like member are attached to the back face 36 of the suction cup body 28.

Also with the suction cup 22 in which the shape retaining member 30 according to the seventh embodiment is used, similar effects to those of the first embodiment are achieved.

It is to be noted that the state wherein the shape retaining member 30 is attached to the back face 36 of the suction cup body 28 includes both of a state wherein the shape retaining member 30 is attached to the surface of the back face 36 of the suction cup body 28 and another state wherein the shape retaining member 30 is embedded in the inside of the back face 36 of the suction cup body 28.

Eighth Embodiment

Figure 19:
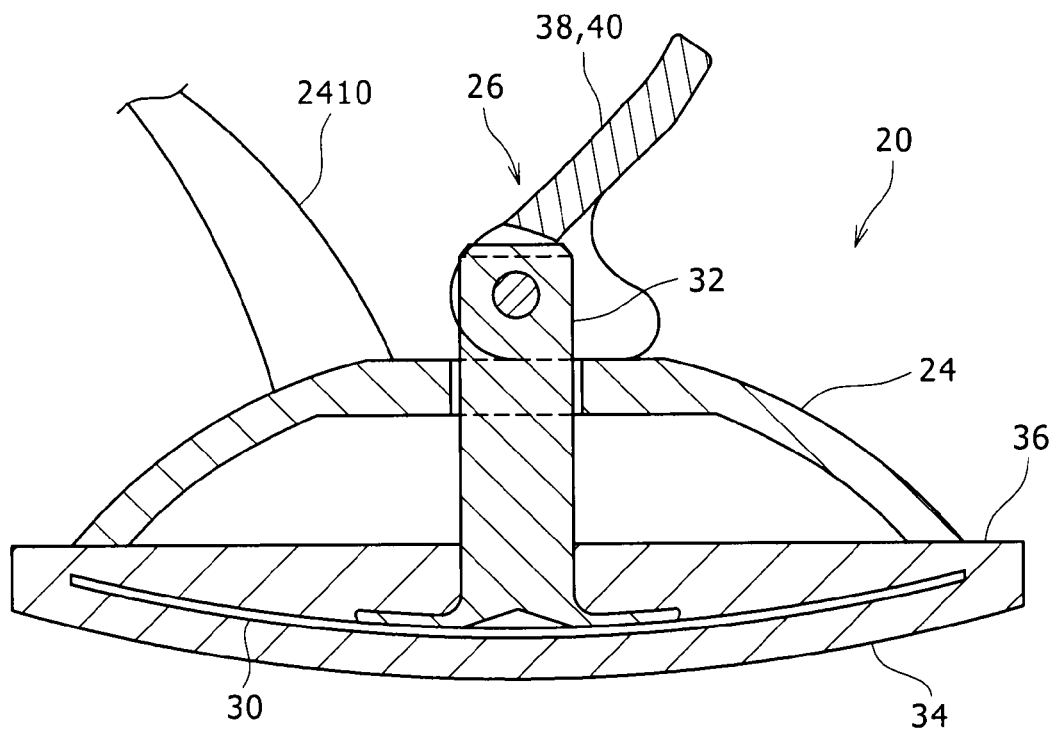
FIG. 19 is a cross sectional view showing a suction cup device according to an eighth embodiment of the present invention in a non-attached state.

FIG. 19 shows a suction cup device 20 according to an eighth embodiment of the present invention which is in a non-attached state.

Referring to FIG. 19, the suction cup device 20 is used so as to be attracted to an attaching object face 2 which has a concave spherical face. To this end, the suction face 34 of the suction cup device 20 is formed as a convex spherical face conforming to the shape of the attaching object face 2.

The shape retaining member 30 extends along the convex spherical plane conforming to the shape of the attaching object face 2. Consequently, the suction face 34 of the suction cup body 28 exhibits a spherical plane conforming to the shape of the attaching object face 2.

With the suction cup 22 in which the shape retaining member 30 according to the eighth embodiment is used, similar effects to those of the first embodiment are achieved. Besides, the suction cup 22 can be advantageously used when it is attracted to the attaching object face 2 having a concave spherical phase.

It is to be noted that it is only necessary for the shape of the suction face 34 to correspond to the shape of the attaching object face 2 and the shape of the suction face 34 may be arbitrarily set to a concave spherical shape, a convex cylindrical shape or a concave cylindrical shape. In such an instance, the shape retaining member 30 may be formed in a shape corresponding to the shape of the suction face 34.

It is to be noted that the attaching base is not limited to that of the embodiments described hereinabove but may be any of various in the past known structures.

Further, the displacement mechanism can be configured arbitrarily. For example, the displacement mechanism may be formed from a single coil spring interposed between the attaching base and the center stem for biasing the center stem in a direction away from the suction face. Thus, various in the past known structures can be adopted for the displacement mechanism.

While preferred embodiments of the present invention have been described using specific terms, such description is for illustrative purpose only, and it is to be understood that changes and variations may be made without departing from the spirit or scope of the following claims.

It should be understood by those skilled in the art that various modifications, combinations, sub-combinations and alterations may occur depending on design requirements and other factor in so far as they are within the scope of the appended claims or the equivalents thereof.

What is claimed is:

1. A suction cup, comprising:
    a suction cup body made of gel and having a face serving as a suction face, said suction cup body being deformable between a non-attached state and an attached state;
    a shape retaining member embedded inside of said suction cup body and having elasticity for restoring said suction cup body to said non-attached state after being deformed to said attached state; and
    a center stem connected to said suction cup body and projecting from a portion of said suction cup body positioned at a distance from a center of said suction face, wherein
    said shape retaining member is formed from a net-like member formed from thin wires member having elasticity and braided into a net of a shape corresponding to a shape of said suction face.

2. The suction cup according to claim 1, wherein said shape retaining member is made of a metal material, a carbon material or a fiber-reinforced plastic material.

3. The suction cup according to claim 1, wherein said shape retaining member has a central portion positioned at a central portion of said suction cup body, and an annular portion positioned at a remaining annular portion of said suction cup body other than the central portion of said suction cup body.

4. The suction cup according to claim 1, wherein said center stem is made of a hard synthetic resin material or a metal material.

5. The suction cup according to claim 1, wherein:
    said suction cup body includes a back face positioned at a distance from said suction face and having a profile corresponding to said suction face; and
    said center stem is connected to said shape retaining member and extends in a direction away from said back face along a thickness direction of said suction face from a central portion of said back face.

6. The suction cup according to claim 5, wherein:
said center stem includes a flange provided at a base end thereof and having a larger diameter than said center stem; and
said shape retaining member is connected to said center stem at said flange.

7. The suction cup according to claim 1, wherein
said suction cup body includes a back face positioned remotely from said suction face and having a profile corresponding to said suction face,
said center stem extends in a direction away from said back face along a thickness direction of said suction face from a central portion of said back face,
said center stem includes a base end connected to said shape retaining member, and
the base end of said center stem and said shape holding member are attached to a back face of said suction cup body.

8. The suction cup according to claim 1, wherein said gel is transparent.

9. The suction cup according to claim 8, wherein said gel is colored.

10. A suction cup device, comprising:
a suction cup;
an attaching base; and
a displacement mechanism;
said suction cup including:
a suction cup body made of gel and having a face serving as a suction face, said suction cup body being deformable between a non-attached state and an attached state;
a shape retaining member embedded inside of said suction cup body and having elasticity for restoring said suction cup body to said non-attached state after being deformed to said attached state; and
a center stem connected to said suction cup body and projecting from a portion of said suction cup body positioned at a distance from a center of said suction face, wherein
said attaching base includes an attaching portion to which an article is attached, and a contacting portion contacting an outer circumferential portion of a back face of said suction cup body or an attaching object face to which said suction face is attracted on an outer side thereof with respect to the back face,
said displacement mechanism is provided between said attaching base and said center stem in such a manner as to displace said center stem in a direction away from said suction face in a state such that said suction face closely contacts the attaching object face and said contracting portion contacts the outer circumferential portion of the back face of said suction cup body or with the attaching object face to which said suction face is attracted on the outer side with respect to the back face, and
said shape retaining member is formed from a net-like member formed from thin wires having elasticity and braided into a net of a shape corresponding to a shape of said suction face, and said center stem is connected to said shape retaining member.

11. The suction cup according to claim 6, further comprising:
a rigid attaching base including a concave surface, a convex surface, and a guide hole between the concave and the convex surfaces, and
a lock lever including a handle and a cam, wherein
said center stem protrudes through the guide hole, and moves in the guide hole between first and second positions respectively corresponding to the non-attached and attached states, such that the suction cup body is positioned on a side of the base corresponding to the concave surface, and
the lock lever is rotationally connected to said center stem on a side of the base corresponding to the convex surface, such that the cam of the lock lever pivots between locking positions causes the lock lever to lock said center stem in the first position and to lock said center stem in the second position, such that a rotational force on the handle of the lock lever moves the center stem from the first position to the second position and an opposing rotational force moves the center stem from the second position to the first position.

12. The suction cup according to claim 11, wherein the cam contacts the convex surface of the base when the center stem is in the first position and when the center stem is in the second position.

13. The suction cup according to claim 12, wherein the handle does not contact the convex surface of the base when the center stem is in the first position and contacts the convex surface of the base when the center stem is in the second position.

14. The suction cup according to claim 1, wherein said shape retaining member is elastically deformable, elastically bends and flexes to a deformed shape when the suction cup body is deformed to the attached state, and returns to an original shape when the suction cup body is restored to the non-attached state.

* * * * *